United States Patent
Van Agt et al.

(10) Patent No.: US 7,571,450 B2
(45) Date of Patent: Aug. 4, 2009

(54) SYSTEM FOR AND METHOD OF DISPLAYING INFORMATION

(75) Inventors: Jeroen Franciscus Hubertus Van Agt, Eindhoven (NL); Gerard David La Hei, Eindhoven (NL); Walter Van Iterson, Eindhoven (NL); Maarten Karel Ter Huurne, Eindhoven (NL); Hyelim Kim, Eindhoven (NL)

(73) Assignee: NXP B.V., Eindhoven (NL)

( * ) Notice: Subject to any disclaimer, the term of this patent is extended or adjusted under 35 U.S.C. 154(b) by 846 days.

(21) Appl. No.: 10/506,836

(22) PCT Filed: Feb. 12, 2003

(86) PCT No.: PCT/IB03/00542

§ 371 (c)(1),
(2), (4) Date: Sep. 7, 2004

(87) PCT Pub. No.: WO03/077540

PCT Pub. Date: Sep. 18, 2003

(65) Prior Publication Data

US 2005/0120379 A1  Jun. 2, 2005

(30) Foreign Application Priority Data

Mar. 11, 2002  (EP) .................................. 02076001

(51) Int. Cl.
*H04H 60/32*  (2008.01)

(52) U.S. Cl. .............................. 725/20; 725/38; 725/48; 725/59

(58) Field of Classification Search .................... 725/38, 725/48, 59, 45, 46
See application file for complete search history.

(56) References Cited

U.S. PATENT DOCUMENTS

| | | | |
|---|---|---|---|
| 5,859,662 A * | 1/1999 | Cragun et al. | 725/137 |
| 6,154,720 A * | 11/2000 | Onishi et al. | 704/2 |
| 6,185,229 B1 * | 2/2001 | Obikane et al. | 370/537 |
| 6,889,384 B1 * | 5/2005 | Soloff | 725/105 |
| 6,928,233 B1 * | 8/2005 | Walker et al. | 386/69 |
| 6,982,233 B2 * | 1/2006 | Buchberger et al. | 501/120 |
| 7,042,511 B2 * | 5/2006 | Lin | 348/445 |
| 7,363,645 B1 * | 4/2008 | Hendricks | 725/41 |
| 2002/0089605 A1 * | 7/2002 | Min | 348/565 |
| 2003/0065503 A1 * | 4/2003 | Agnihotri et al. | 704/7 |
| 2003/0147010 A1 * | 8/2003 | Joung et al. | 348/565 |
| 2004/0119815 A1 * | 6/2004 | Soloff | 348/39 |

* cited by examiner

*Primary Examiner*—Christopher Kelley
*Assistant Examiner*—Sahar A Baig

(57) ABSTRACT

A system (100) for displaying information on a display device (104) comprises; receiving means (202) for receiving services; user interface means (220) for making a user selection of a type of information to be displayed on the display device (104); a filter (206) for selecting a data-element of a first one of the services on basis of the user selection; and rendering means (208) for calculating an output image to be displayed on the display device (104), on basis of output of the filter (206). The system (100) is designed to apply the filter (206) for selecting a second data-element of the second one of the services, on basis of the user selection, when being switched from the first one of the services to a second one of the services, with the data-element and the second data-element being mutually semantically related.

17 Claims, 2 Drawing Sheets

SYSTEM FOR AND METHOD OF DISPLAYING INFORMATION

Figure 1:
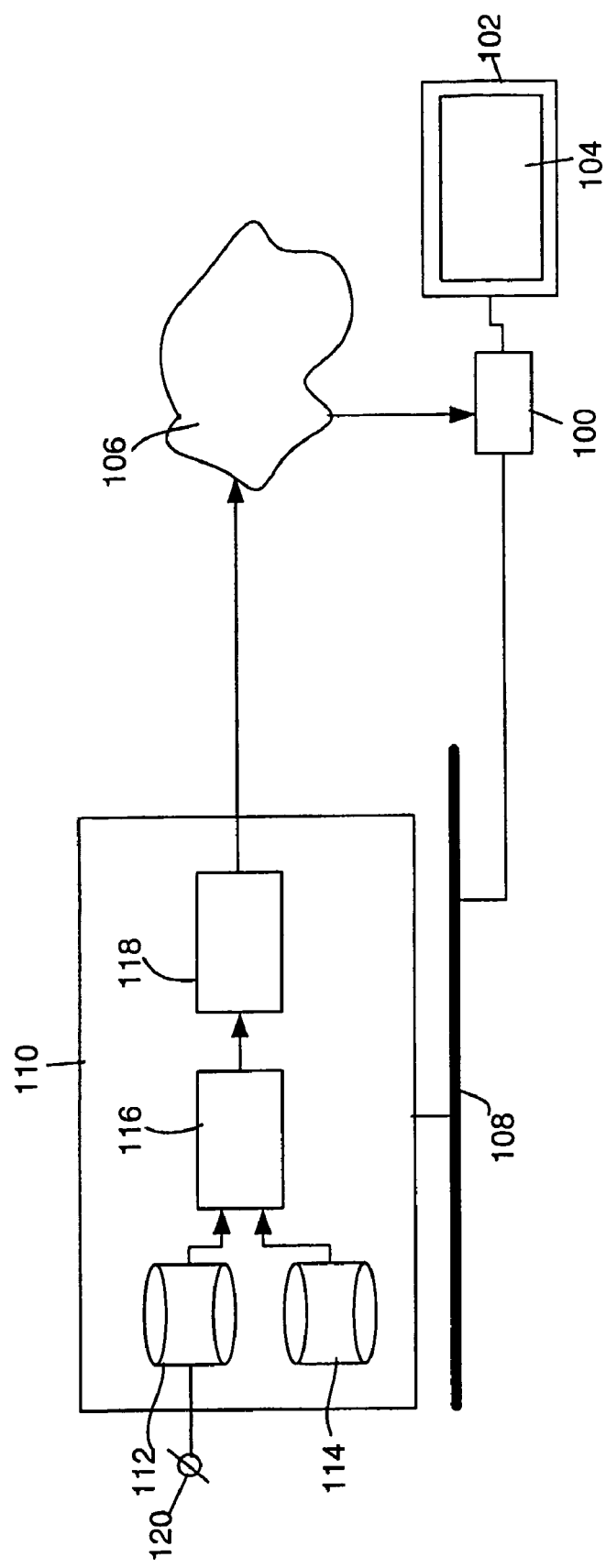

The invention relates to a system for displaying information on a display device, comprising:
- receiving means for receiving a transport stream comprising services, with the services having elementary streams of video and of data-elements;
- user interface means for making a user selection of a type of information to be displayed on the display device;
- a filter for selecting a first data-element of a first one of the services on basis of the user selection;
- rendering means for calculating an output image to be displayed on the display device, on basis of the first data-element selected by the filter; and
- switching means for switching from the first one of the services to a second one of the services.

The invention further relates a method of displaying information on a display device comprising the steps of:
- receiving a transport stream comprising services, with the services having elementary streams of video and of data-elements;
- user actions of making a user selection of a type of information to be displayed on the display device;
- filtering to select a first data-element of a first one of the services on basis of the user selection;
- rendering to calculate an output image to be displayed on the display device, on basis of the first data-element selected by the filter; and
- switching from the first one of the services to a second one of the services.

An embodiment of the system of the kind described in the opening paragraph is known as set top box. A set top box is linked to a Digital Video Broadcast (DVB) server by means of a broadband network and optionally by means of a second network, primarily for data flow from the set top box. Typically the broadcast server and the set top box are in compliance with a standard, e.g. Multimedia Home Platform (MHP). The Broadcast server is responsible for generating a transport stream, e.g. an MPEG-2 transport stream comprising video, audio and data. The data comprises application data, i.e. software code representing an application to be run on the set top box, and data to be processed by such an application. A set top box provides its output to a television. Optionally the set top box is integrated into the television. The set top box is arranged to receive the transport stream and to select one of the services. Typically a service comprises mutually related elementary streams of video, audio and data. E.g. a video stream of a service represents a sequence of images being captured of a football match. Optionally there is a further video stream which represents another sequence of images being captured of the football match from another point of view. An audio stream corresponds to the sound being captured in the stadium of this football match and another audio stream corresponds to the voice of a reporter. The data is also related to football. The data of the data stream might correspond to the actual situation of the match, e.g. the score, who made the goals and when, the number of yellow and red cards, the current players of the teams, etcetera. The data might also correspond to other aspects of football, e.g. the tournament schedule, statistical information on teams and players, etcetera.

The set top box comprises means to select a service from the transport stream. The set top box further comprises user interface means for making a user selection of the type of information to be displayed on the television. Typically this works by means of a graphical user interface which is the visible part of an application. The user is provided with menus of options corresponding to information which is available in the elementary data stream of the selected service. By browsing through the menus and by selecting an option the user defines which type of data, i.e. which data-elements, should be selected from this elementary data stream which has been partly received and is partly to be received, by the set top box. A visual representation of the selected data-elements is then displayed on the television. E.g. "Team A-Team B: 0-2". The user can switch to another service for which he can also select information to be displayed, by means of browsing and selecting provided options. In the latter case the provided options relate to the most recently selected service.

It is an object of the invention to provide a system of the kind described in the opening paragraph which is more user friendly.

The object of the invention is achieved in that the system is designed to apply the filter for selecting a second data-element of the second one of the services, on basis of the user selection, when being switched from the first one of the services to the second one of the services, with the first data-element and the second data-element being mutually semantically related and to apply the rendering means for calculating the output image to be displayed on the display device, on basis of the second data-element selected by the filter. The user does not have to make a new selection after being switched from the first service to the second service. That means that the user does not have to browse again through the menus in order to define which type of information he is interested in. The user selection being made on basis of the provided options while the first service was selected, is used to select the appropriate data-elements of the stream of the second service. The invention is based on the insight that different services often have the same information model, i.e. data model. That also means that various content providers share one information model or make use of similar information models.

An embodiment of the system according to the invention is designed to apply the filter for selecting the second data-element, when being switched from the first one of the services to the second one of the services, with the data-element and the second data-element being mutually semantically equal. Preferably the data-element and the second data-element are also syntactically equal. The working of this embodiment will be explained by means of an example. Suppose that the user has selected the option "show actual score" while watching a football match being provided by means of the first service. The result is that data-elements which are classified with label "Score" are filtered from the incoming data-elements belonging to the first service. The current score of the football match, which is broadcast via the first service, is displayed on the display device. After being switched to a second service, corresponding to another football match, data-elements which are classified with label "Score" are filtered from the incoming data-elements belonging to the second service. Now the current score of the other football match, which is broadcast via the second service, is displayed on the display device.

Another embodiment of the system according to the invention comprises a converter for controlling the filter to select the second data-element on basis of the user selection and a third data-element of the second one of the services. The working of this embodiment will be explained by means of an extension of the example above. Suppose that the user has selected the option "show actual score" while watching a football match being provided by means of the first service. The result is that data-elements which are classified with label "Score" are filtered from the incoming data-elements belonging to the first service. Now the user switches to the second service, which comprises streams of video, audio and data of a tennis game. In this latter data stream there are no data-elements with label "Score". However there are data-elements with label "tennis" and there are data-elements with labels "Scores". The converter is able to map "Score" to "Scores" on basis of a data-element with label "tennis". This embodiment of the system according to the invention is advantageous in the case that different services do not have the same information model but that it is possible to map a data type of a first information model into a data type of a second information model.

In an embodiment of the system according to the invention, the rendering means are arranged to calculate a mixed output image to be displayed on the display device, on basis of the selected data-element and a first image of a first elementary stream of video. Preferably the graphical representation of the data-element is displayed as an overlay on the input images of the video stream.

An embodiment of the system according to the invention comprises storage means for storage of a parameter which determines the filter. The advantage of this embodiment is that the properties of the filter are made persistent. After a restart of the system or application the same filtering operation can be performed.

An embodiment of the system according to the invention is arranged to run an application, which enables in making the user selection and of which software code is being exchanged by means of a first elementary stream of data-elements. By exchanging the software code via the transport stream, it is possible to have up-to-date software at the client side of the network, i.e. in the system, e.g. set top box. This is especially important in the case of modifications of an information model and for the converter.

An embodiment of the system according to the invention comprises the display device. The system might comprise a separate set top box and television. But preferably these two are integrated into one unit.

It is a further object of the invention to provide a method of the kind described in the opening paragraph which is more user friendly.

This object of the invention is achieved in that the method of displaying information on a display device is characterized in comprising a second step of filtering to select a second data-element of the second one of the services, on basis of the user selection, when being switched from the first one of the services to the second one of the services, with the first data-element and the second data-element being mutually semantically related and a second step of rendering to calculate the output image to be displayed on the display device, on basis of the second data-element selected by the filter.

Modifications of the system and variations thereof may correspond to modifications and variations thereof of the method described.

Figure 2:
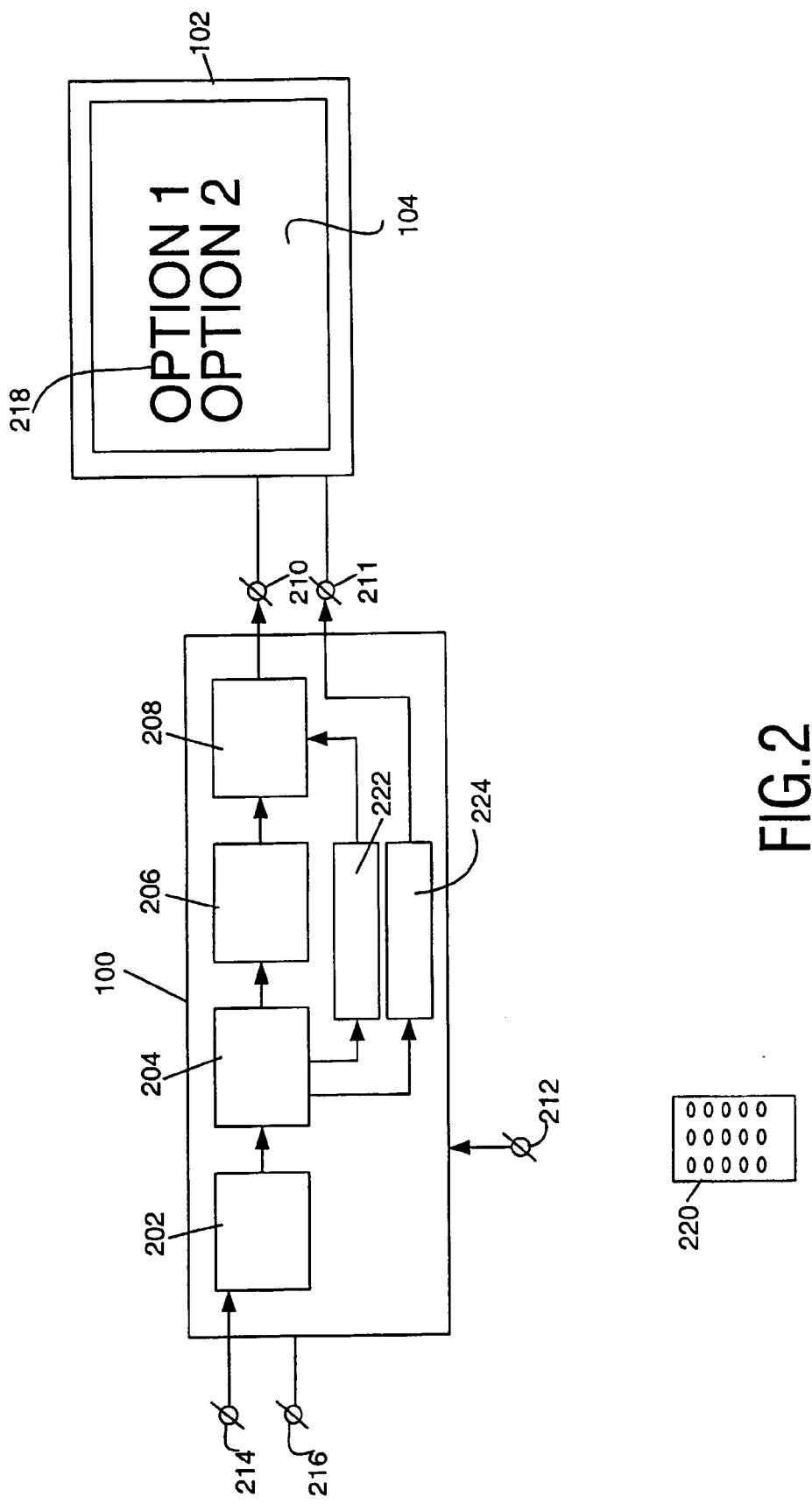

These and other aspects of the system and of the method according to the invention will become apparent from and will be elucidated with respect to the implementations and embodiments described hereinafter and with reference to the accompanying drawings, wherein:

FIG. 1 schematically shows an embodiment of the system according to the invention in its context; and FIG. 2 schematically shows components of an embodiment of the system according to the invention.

Corresponding reference numerals have same or like meaning in all of the Figures.

FIG. 1 schematically shows an embodiment of the system 100 according to the invention in its context. The system 100 has a number of connections with other systems 102 and 110:

The system 100 is connected to a broadcast server 110 by means of a broadband network 106. The broadcast server 110 is responsible for providing the transport streams to the broadband network 106.

The system 100 is connected to a television 102 which comprises a display device 104. Video and audio content and data being exchanged via the system 100 are displayed on the television 102.

The system 100 is optionally connected to a broadcast server 110 by means of a second network 108, e.g. Ethernet. This second network is primarily used for data exchange from the system 100 to e.g. the broadcast server 110.

The broadcast server 110 comprises a first storage means 112 for storage of video and audio content being provided by means of input connector 120. The broadcast server 110 also comprises a second storage means 114 for storage of data. This data comprises application data, i.e. software code which is the base of an application to be run on the system 100, and of data to be processed by the application. The video and audio content are multiplexed with the data by means of multiplexer 116. The resulting transport stream is modulated by means of the modulator 118 which is designed to convert the transport stream to a higher frequency such that it can be transmitted on the broadband network 106 (e.g. terrestrial or satellite).

FIG. 2 schematically shows components 202-208, 222-224 and interfaces 212216 of an embodiment of the system 100 according to the invention. The system 100 comprises:

receiving means 202 for receiving transport streams being provided on the input connector 214. A transport stream comprises services. A service comprises elementary streams of video, audio and of data-elements;

user interface means 220 for making a user selection of a type of information to be displayed on the display device 104. Preferably the user interface means comprise a remote control unit 220. The signals sent by the remote control 220 are received via input sensor 212. Another part of the user interface means is the display device 104 of the television 102. Use is made of the so-called On Screen Display feature (OSD). Via the display device 104 the user is provided with graphical representations 218 of the data-elements;

switching means 204 for switching from a first one of the services to a second one of the services. Switching might mean that new application data is downloaded to be run. But it is also possible that one and the same application is handling multiple services.

a filter 206 for selecting data-elements of the first one of the services on basis of the user selection made by the user. Note that multiple data-elements related to the same information are sent. E.g. assume that the information is the current score of a live football match. As long as the score equals "0-1" data-elements are exchanged, e.g. every second, containing this information. However, if a goal has been made the situation is changed and from that moment on data-elements will be exchanged reflecting the new situation, e.g. data-elements representing the score with value "0-2".

rendering means 208 for calculating graphical representations of data-elements to be displayed on the display device 104, on basis of output of the filter 206;

an Ethernet connector 216 for exchange of information from the system 100 back to e.g. the broadcast server 110;

a video processor 222 for processing the video stream. Eventually the graphical representations of data-elements are merged with the input images of the video stream resulting in a series of output images to be displayed on the display device 104. The rendering means 208 are arranged to merge these. The signal representing these output images is provided to the input connector 210 of the television 102.

an audio processor 224 for processing the audio stream. The signal representing the processed audio stream is provided to the input connector 211 of the television 102.

The working of the system 100 according to the invention will be explained by means of examples. It is assumed that the data-elements being exchanged from broadcast server 110 to the system 100 are conform a predefined information model. Table 1 comprises a part of such an information model. Each row of Table 1 belongs to a separate data type. The first column corresponds to a unique identification of each data type. The second column corresponds to the name of the data type. The third column corresponds to the type of the data type. In the fourth column a description of the data type is given and in the fifth column an example of the data type is given.

TABLE 1 specification of data-elements:

| Identification | Name | Type | Description | Example |
| --- | --- | --- | --- | --- |
| 0000 | Score | Integer array | Current score of sports game | 2, 3 |
| 0001 | HalfScore | Integer array | Score of sports game after half playing time | 0, 0 |
| 0002 | FinalScore | Integer array | Score of sports game after full playing time | 3, 4 |
| 0003 | Goaltimes | Integer array | Moments of time of the goals | 12, 34, 56 |

Suppose that a user has selected a first service of the transport stream. This service corresponds with a football match between teams A and B. The user is interested to be informed about the current score of the match. Via the remote control 220 of the system the user provides a command to show which type of score information is available in the first service. The result of this command is that the application running on the system 100 creates a graphical overlay, which is mixed with the input images of the video stream, by means of the rendering means 208. The final output images are displayed on the display device 104 of the television. These output images comprises the following text:

"What do you want to be shown?"

"Current score"

"Score after half playing time"

"When were the goals made"

The user indicates that only the current score should be displayed. As a result, from now on the filter 206 will fetch all data-elements of the data stream with the right type, i.e. with identification 0000 and with name "Score" (See Table 1). Data-elements which do not have this type will be skipped by the filter. A graphical representation of the current score will be displayed on the display device 104. Note that the values of the series of incoming data-elements might be mutually different, e.g. "0-", "0-", "1-1", etcetera.

After a while the user switches to another service, e.g. corresponding to a movie. In the elementary streams corresponding to this service there are no data-elements with the type corresponding to "Score". Hence there will be nothing displayed about football scores.

Then the user zaps further to a third service which corresponds to a football match between team C and team D. In the elementary streams corresponding to this third service there are data-elements with the type corresponding to "Score". The filter 204 will fetch these data-elements and a graphical representation of the current score of the match between team C and D will be displayed on the display device 104.

Up till now the data-elements were considered as independent information entities. However in most cases data-elements are structured, e.g. in modules or objects. A common approach of modeling is based on objects being specified by their data-elements and the parents and child they have. In such a way a so-called object tree can be defined. For instance a tree with as root "sports". The children of the root-object are "tennis" and "football". The children of the "football"-object are "World championship", "European championship" and "Dutch championship". The children of the "Dutch championship"-object are "schedule", "team" and "results". The "team"-object comprises "player"-objects and "coach"-object. In Table 2 some data-elements of the "player"-object, having a "football"-object as ancestor, are specified.

TABLE 2 specification of data-elements of "player" object for "football":

| Identification | Name | Type | Description | Example |
| --- | --- | --- | --- | --- |
| 1000 | FirstName | String | Family name | Jansen |
| 1001 | NickName | String | Nick name | Speedy |
| 1002 | Age | Integer | Age | 25 |
| 1003 | Interlands | Integer | Number of international games played | 17 |

For tennis a similar object definition is made, but which is slightly different. See table 3.

TABLE 3 specification of data-elements of "player" object for "tennis":

| Identification | Name | Type | Description | Example |
| --- | --- | --- | --- | --- |
| 2000 | FirstName | String | Family name | Jansen |
| 2001 | NickName | String | Nick name | Speedy |
| 2002 | Age | Integer | Age | 25 |
| 2003 | Tournaments | Array of Strings | International tournaments won | Wimbledon |

Suppose that the user, watching the football match between team A and B had indicated to display the information of the players. Then the user switches to a service corresponding to a tennis game. The result will be that the information comprised by the "player"-objects of tennis will be displayed. Hence, the number of international games played will not be shown but instead the international tournaments won will be listed. This can be realized in several ways. A first approach is based on filtering on a data-element related to a "player"-object. Another approach is based on a mapping table in which is specified that data-elements with identification 1003 (Interlands) must be mapped to 2003 (Tournaments). This mapping can be realized by a so-called converter.

Not only for sports but for every type of service an information model can be made. Even by switching from a sport service to a movie service, the filter defined while watching the first service, can be reused. By means of example the "actor"-object of a movie is given in Table 4. So switching from football to a movie might mean that a data-sheet of an actor currently visible is provided too. This is because the converter maps a "player"-object to an "actor"-object.

TABLE 4 specification of data-elements of "actor" object for "movie"

| Identification | Name | Type | Description | Example |
| --- | --- | --- | --- | --- |
| 3000 | FirstName | String | Family name | Nickelson |
| 3001 | NickName | String | Nick name | Speedy |
| 3002 | Age | Integer | Age | 25 |
| 3003 | Movies | Array of Strings | Played in these movies | Shining |

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A system for displaying information on a display device, comprising:
    receiving means for receiving a transport stream comprising services, with the services having elementary streams of video and of non-video data-elements;
    user interface means for making a user selection of a type of information to be displayed on the display device;
    a filter for selecting a first data-element of a first one of the services on basis of the user selection;
    rendering means for calculating an output image to be displayed on the display device, on basis of the first data-element selected by the filter; and
    switching means for switching from the first one of the services to a second one of the services, characterized in that the system is designed to apply the filter for selecting a second data-element of the second one of the services, on basis of the user selection, when being switched from the first one of the services to the second one of the services, with the first data-element and the second data-element being mutually semantically related and to apply the rendering means for calculating the output image to be displayed on the display device, on basis of the second data-element selected by the filter.

2. A system as claimed in claim 1, characterized in that the system is designed to apply the filter for selecting the second data-element, when being switched from the first one of the services to the second one of the services, with the data-element and the second data-element being mutually semantically equal.

3. A system as claimed in claim 1, characterized in comprising a converter for controlling the filter to select the second data-element on basis of the user selection and a third data-element of the second one of the services.

4. A system as claimed in claim 1, characterized in that the rendering means are arranged to calculate a mixed output image to be displayed on the display device, on basis of the selected data-element and a first image of a first elementary stream of video.

5. A system as claimed in claim 1, characterized in comprising storage means for storage of a parameter which determines the filter.

6. A system as claimed in claim 1, characterized in being arranged to run an application, which enables in making the user selection and of which software code is being exchanged by means of a first elementary stream of data-elements.

7. A system as claimed in claim 1, characterized in comprising the display device.

8. A method of displaying information on a display device, comprising the steps of:
    receiving a transport stream comprising services, with the services having elementary streams of video and of data-elements;
    user actions of making a user selection of a type of information to be displayed on the display device;
    filtering to select a data-element of a first one of the services on basis of the user selection;
    rendering to calculate an output image to be displayed on the display device, on basis of the first data-element selected by the filter; and
    switching from the first one of the services to a second one of the services, characterized in comprising a second step of filtering to select a second data-element of the second one of the services, on basis of the user selection, when being switched from the first one of the services to the second one of the services, with the data-element and the second data-element being mutually semantically related and a second step of rendering to calculate the output image to be displayed on the display device, on basis of the second data-element selected by the filter.

9. The system as claimed in claim 1, wherein the data elements do not include image data and wherein the rendering means calculates an output image from the data elements by generating new image data representing the data elements.

10. The system as claimed in claim 1, wherein the data elements include statistical data relating to images being displayed, and wherein the rendering means calculates an image to display statistics corresponding to the statistical data.

11. A system for displaying information from different media services on a display device, the system comprising:
    a receiver to receive transport streams including video and data-elements for the media services;
    a user interface to receive and provide user selections of a type of information to be displayed on the display device;
    a switch to switch between the media services received at the receiver;
    a filter to
        select a first data-element of a first one of the services in response to user selections received via the user interface, and
        select a second data-element of a second one of the services, in response to user selections received via the user interface, when the switch switches from the first one of the services to the second one of the services, with the first data-element and the second data-element being mutually semantically related; and an image renderer to calculate an output image to be displayed on the display device in response to the data-element selected by the filter.

12. The system of claim 11, wherein the filter selects data elements that are semantically related based upon the provided user selections of a type of information, thereby facilitating the presentation of data-element information by the image renderer that is for a similar type of data for different services.

13. The system of claim 11, wherein the filter selects data elements by selecting statistical information for each service, the statistical information being semantically related, and the image renderer calculates an output image to be displayed using the statistical information for the service being displayed.

14. The system of claim 11, wherein the filter selects the first data-element and the second data-element in response to a single user selection input.

15. The system of claim 11, wherein the image renderer calculates an output image to be displayed on the display device in response to the data-element selected by the filter by executing software code in the data element to generate output image data.

16. The system of claim 11, wherein the image renderer calculates an output image to be displayed on the display device in response to the data-element selected by the filter by identifying that the first and second ones of the services are based upon a common information model.

17. A system for generating video data for streamed video events having ancillary data associated therewith, the system comprising:
- a user interface configured to receive and provide user selections of a type of ancillary data to be displayed for a particular type of video event;
- a receiver configured to receive a transport stream for each of the video events, each transport stream including video data and a plurality of different sets of ancillary data, each set of ancillary data having a data tag that identifies a type of the ancillary data;
- a switch configured to switch between the transport streams received at the receiver;
- a filter configured to select, for each transport stream, a set of ancillary data having a data tag that identifies a type of ancillary data specified in the user selections for a video event type of the transport stream; and
- an image renderer configured, for each transport stream and its corresponding video event, to generate video data including the set of ancillary data selected by the filter.

* * * * *